US00RE47283E

(19) United States
(12) Reissued Patent
Rosenberg et al.

(10) Patent Number: US RE47,283 E
(45) Date of Reissued Patent: Mar. 12, 2019

(54) DISPLAY PANEL OR PORTION THEREOF WITH A CHANGEABLE GRAPHICAL USER INTERFACE COMPONENT

(71) Applicant: Google Inc., Mountain View, CA (US)

(72) Inventors: Greg Rosenberg, San Mateo, CA (US); William Wayne Woodworth, San Francisco, CA (US)

(73) Assignee: Google LLC, Mountain View, CA (US)

(21) Appl. No.: 29/614,296

(22) Filed: Aug. 17, 2017

Related U.S. Patent Documents

Reissue of:
(64) Patent No.: Des. 736,785
Issued: Aug. 18, 2015
Appl. No.: 29/455,656
Filed: May 23, 2013

(51) LOC (11) Cl. ..... 14-04
(52) U.S. Cl.
USPC ..... D14/485
(58) Field of Classification Search
USPC ..... D14/485–495; D18/26, 31, 32, 33; D20/11, 12, 23, 24, 25, 29, 30, 31, 32, D20/36, 37, 38
(Continued)

(56) References Cited

U.S. PATENT DOCUMENTS 5,957,559 A * 9/1999 Rueb et al. ..... G05B 19/41805 345/902
D705,798 S * 5/2014 Lim et al. ..... D14/486
(Continued)

*Primary Examiner* — Darlington Ly
(74) *Attorney, Agent, or Firm* — Leason Ellis LLP

(57) CLAIM

The ornamental design for a display panel or portion thereof with a changeable graphical user interface component, as shown and described.

DESCRIPTION

Figure 1:
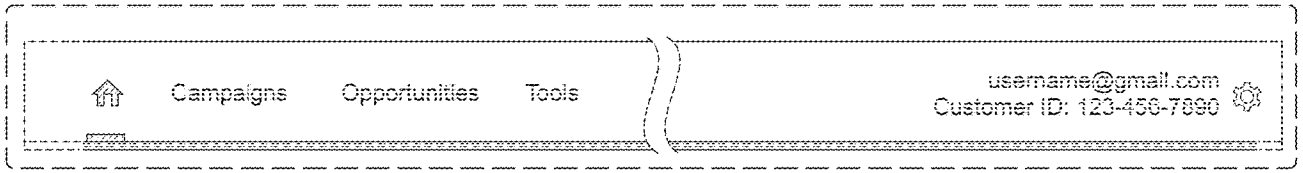
FIG. 1 is a front view of a display panel or portion thereof with a changeable graphical user interface ("UI") component, comprising a first image in a sequence.
Figure 2:
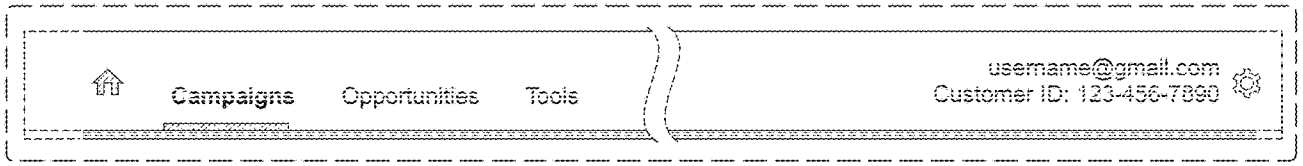
FIG. 2 is a front view of a second image included in the sequence.
Figure 3:
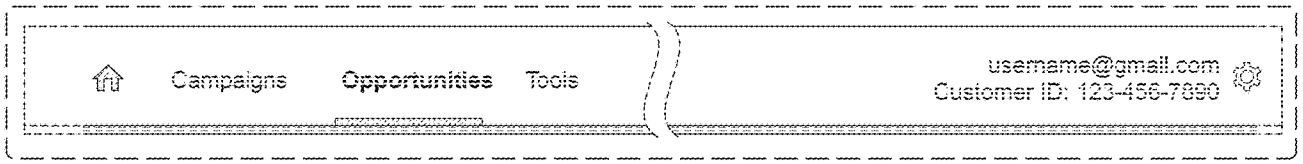
FIG. 3 is a front view of a third image included in the sequence.
Figure 4:
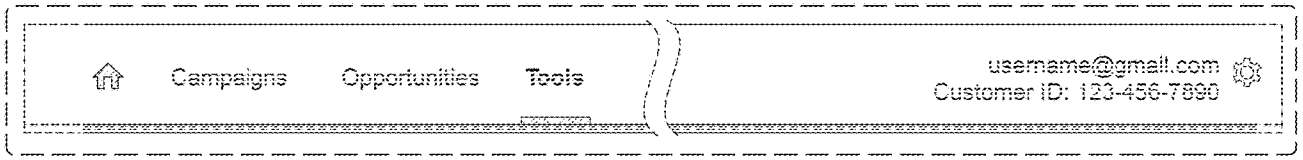
FIG. 4 is a front view of a fourth image included in the sequence.
Figure 5:
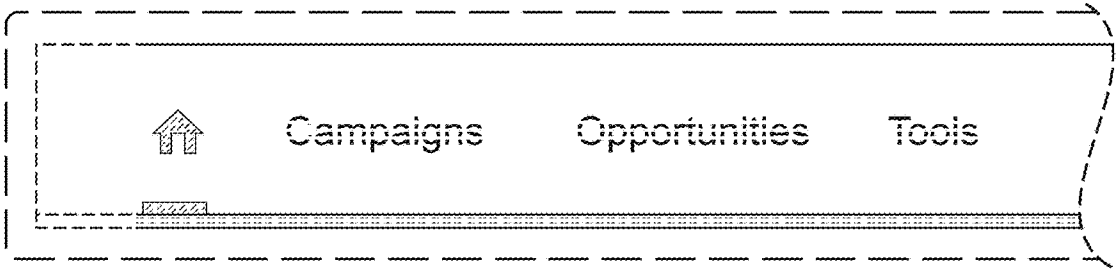
FIG. 5 is an enlarged front view of the left side of FIG. 1, up to the curved broken-away line to show details at a larger scale; and, FIG. 6 is an enlarged front view of the left side of FIG. 2, up to the curved broken-away line to show details at a larger scale.
Figure 6:
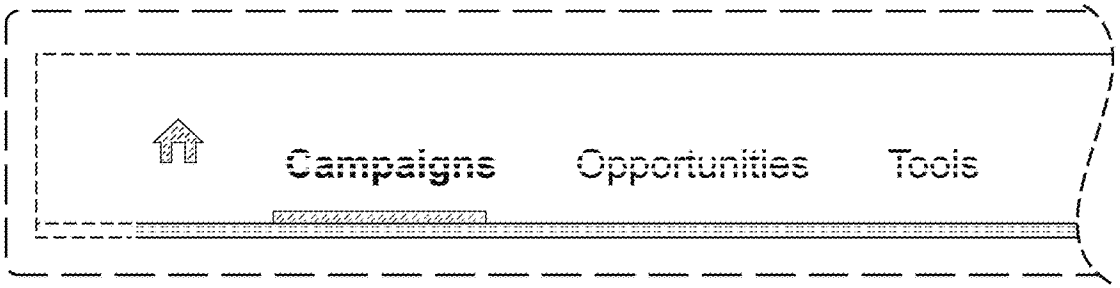

[The subject matter in this patent includes a process or period during which a computer icon image changes into another image. This] *The appearance of the changeable graphical user interface sequentially transitions between the images shown in FIGS. 1-4. The* process or period in which one [computer icon] image transitions [into] *to* another *image* forms no part of the claimed design.

The curved broken-away lines indicate break lines and the appearance of any portion of the article between the break lines forms no part of the claimed design. The large broken lines surrounding the user interface in the figure drawings represent portions of a display panel and form no part of the claimed design. The [small] broken lines represent portions of the user interface and form no part of the claimed design.

1 Claim, 2 Drawing Sheets

Matter enclosed in heavy brackets [ ] appears in the original patent but forms no part of this reissue; matter printed in italics indicates the additions made by reissue.

Campaigns Opportunities Tools
username@gmail.com
Customer ID: 123-456-7890

(58) Field of Classification Search
CPC ..... G06F 3/048; G06F 3/0481; G06F 3/0482; G06F 3/04817; G06F 3/04812
See application file for complete search history.

(56) References Cited

U.S. PATENT DOCUMENTS

| | | | | |
|---|---|---|---|---|
| 8,842,085 | B1 * | 9/2014 | Goodspeed et al. | G06F 17/21 345/173 |
| D718,323 | S * | 11/2014 | Hwang et al. | D14/486 |
| D759,038 | S * | 6/2016 | Kadosh | D14/485 |
| D771,073 | S * | 11/2016 | Choi | D14/485 |
| D782,508 | S * | 3/2017 | Ouilhet | D14/486 |
| D790,566 | S * | 6/2017 | Ouilhet | D14/486 |
| D791,152 | S * | 7/2017 | Ouilhet | D14/486 |
| 2005/0122315 | A1 * | 6/2005 | Chalk et al. | G06F 1/1626 345/173 |
| 2005/0131856 | A1 * | 6/2005 | O'Dea | G06F 3/0482 |
| 2011/0291985 | A1 * | 12/2011 | Wakako et al. | G06F 3/04817 345/174 |
| 2011/0310048 | A1 * | 12/2011 | Ramarao et al. | G06F 3/04817 345/173 |
| 2012/0173659 | A1 * | 7/2012 | Thaxter et al. | G06F 15/0291 709/217 |
| 2012/0226979 | A1 * | 9/2012 | Harberts et al. | G06F 3/0482 715/702 |
| 2013/0027736 | A1 * | 1/2013 | Kittaka | G06F 3/04817 358/1.14 |
| 2013/0235271 | A1 * | 9/2013 | Kasuga et al. | H04N 5/44543 348/569 |
| 2014/0189597 | A1 * | 7/2014 | Kang | G06F 3/04817 715/835 |
| 2014/0215340 | A1 * | 7/2014 | Shetty et al. | G06F 3/0488 715/727 |
| 2014/0304730 | A1 * | 10/2014 | Lettau et al. | H04N 5/91 725/32 |

* cited by examiner